United States Patent [19]

Hara et al.

[11] Patent Number: 5,031,095
[45] Date of Patent: Jul. 9, 1991

[54] DATA TRANSMISSION APPARATUS

[75] Inventors: Yoshifumi Hara, Hirakata; Saburo Kubota; Tutomu Sakurai, both of Katano; Satoshi Tanaka, Higashiosaka, all of Japan

[73] Assignee: Matsushita Electric Industrial Co., Ltd., Kadoma, Japan

[21] Appl. No.: 158,199

[22] Filed: Feb. 19, 1988

[30] Foreign Application Priority Data

Feb. 20, 1987 [JP] Japan ................................ 62-38455

[51] Int. Cl.$^5$ ................................ G06F 3/00
[52] U.S. Cl. ................................ 364/200; 340/825.05; 364/229.3; 364/230.4; 364/239.2; 364/241.2
[58] Field of Search ... 364/200 MS File, 900 MS File; 340/825.05, 825.1, 825.12; 370/85.1, 85.15, 91

[56] References Cited

U.S. PATENT DOCUMENTS 4,028,667 6/1977 Breslau et al. ...................... 364/200

Primary Examiner—Joseph A. Popek
Assistant Examiner—Rebecca L. Rudolph
Attorney, Agent, or Firm—Cushman, Darby & Cushman

[57] ABSTRACT

When an input data of a slave station makes any change, the slave station transmit a serial information (in serial data frame, FIG. 2) which is made by altering an information continuously transmitted from a master station into a serial information to be transmitted by interrupt, which serial information includes a start information (in start bit), interrupt information (in interrupt field), address information (in address field) of this slave station and data information (in data field) produced in this sub-station responding the change, and it is transmitted by the interrupt; therefore the master station can find the interrupt-transmitted serial information among many serial informations sent back thereto, and the slave station can immediately transmit the change to the master station without wasting time by waiting for one turn scanning of all the slave stations.

7 Claims, 10 Drawing Sheets

DATA TRANSMISSION APPARATUS

FIELD OF THE INVENTION AND RELATED ART STATEMENT

1. Field of the Invention

The present invention relates to a data transmission apparatus, and more particularly to a data transmission apparatus wherein a master station and plural slave stations are connected serially in a loop form for transmitting various data from the master station to the slave stations or from a slave station to the master station, and the apparatus is suitable for use in automatic machines having many data to be used therein.

2. Description of the Related Art

In recent years, as a result of popular utilizations of microprocessors, automatic machines are acquiring higher functions. In such an automatic machine, sometimes several hundreds or thousands of sensors or actuators are used, controlled by a single microprocessor. Data communications among line control computer, various instruments and facilities are also increasing. Therefore, the total length of wiring in such automatic machine and in a factory using such machines becomes very much long, and such system has more than several hundreds of input terminals and output terminals. As a result, when once trouble has happened, the trouble shooting is very difficult, thereby lowering reliability. Besides, the large amount of wiring makes the system expensive. In order to decrease the number of wiring, a system which is made by providing a control unit called remote I/O at a close vicinity of each sensor or actuator has been developed. In such system, many sensors and actuators, which are connected in a serial multiple signal transmission system by using only a single optical fiber or a single coaxial cable, have been developed, thereby to save the number of connection lines. The conventional data transmission system has a general configuration as shown in FIG. 12.

Figure 12:
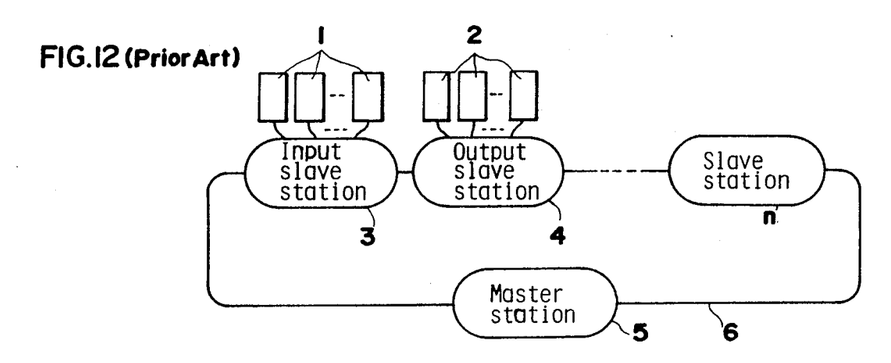
FIG. 12 is an overall configuration of the conventional data transmission system.

The general information transmission system shown in FIG. 12 comprises the remote I/O, wherein a number of input slave stations 3, 3 and output slave stations 4, 4, ... and a master station 5 for controlling these input slave stations 3, 3, ... and output slave stations 4, 4, ... are connected in series by optical fiber lines or by electric wires to form a loop type circuit. Each input station comprises several sensors 1, 1, ... and each output station has a predetermined number of actuators 2, 2, .... In general, in such remote I/O system, making branches, i.e., making of passive taps, is very difficult. Therefore, in each slave station, namely in each input slave stations 3, 3 ... or output slave stations 4, 4 ..., it is necessary that optical signals are once transformed into electric signals, and the electric signal is further transformed into the optical signal for transmission from the slave stations, with or without additions of some information or substitution of a part of information therein.

Figure 13:
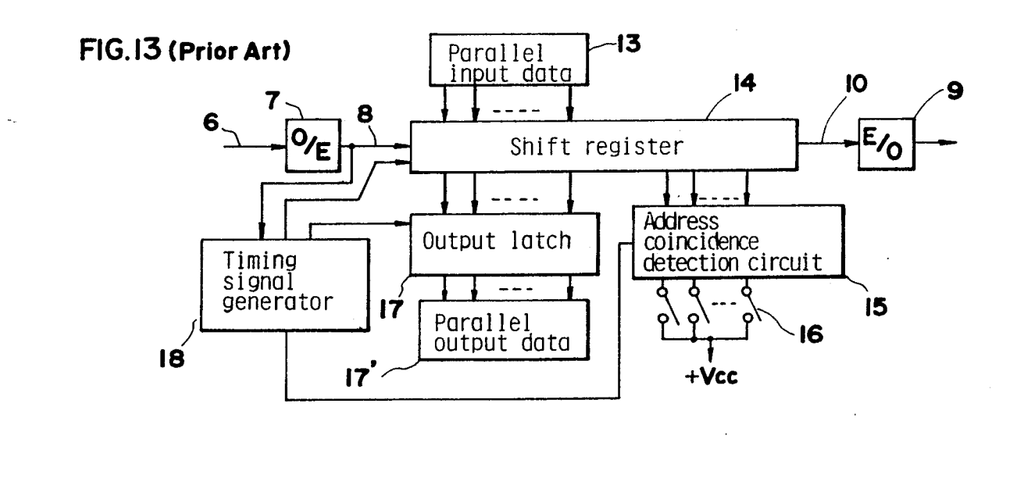
FIG. 13 is a circuit block diagram of slave station of the conventional example.

One example of the configuration of the conventional slave station is shown in FIG. 13.

In FIG. 13, input data are given from the sensors 1 and the output data are issued to the actuators 2 of FIG. 12. In FIG. 13, an optical serial signal given through the optical fiber 6 and received by an opto-electric converter 7 is once stored in a shift register 14, which can perform serial in parallel out (in other words: "serial-parallel") conversion and in the later parallel load serial out (in other words: "parallel-serial") conversion. Address setting switch 16 is for manual setting of the address of this slave station. Thereafter, when an address coincidence detection circuit 15 detects that this slave station of the loop type system is addressed now, an output latch 17 stores output data. Data which is once stored in the shift register 14 is replaced by input data 13. The contents of the shift register 14 is outputted serially and then electro-optically converted by an electro-optical converter 9 and transmitted into the loop circuit of optical fiber cable. When address does not coincide with the address of this slave station, the above-mentioned replacing by the input data is not made, and the incoming information once stored in the shift register 14 is transmitted through the electro-optic transducer as it is.

Figure 14:
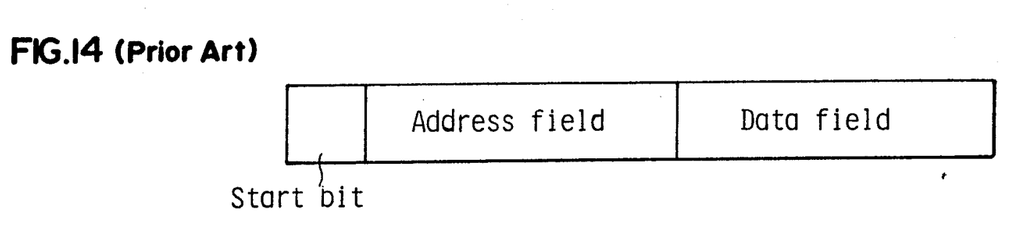
FIG. 14 is a chart showing transmission format of the conventional example.

From the master station 5, the control data is transmitted as serial information or so that a serial data frame consisting of a pulse train is transmitted to the slave stations. Transmission format of the serial data frame, as shown in FIG. 14, consists of a start bit, which is for detecting the top part of the serial data frame by the slave station, an address field, which is for detecting a selected slave station and a data field, which is to be transmitted to a slave station. The control in the above-mentioned procedure is controlled by outputs of a timing signal generator 18.

As shown in FIG. 13, serial data frame transmitted from the master station 5 through the optical fiber cable 6 is converted to an electric signal by an optoelectric converter 7. The converted serial data frame 8 is once stored in a shift register 14 which can perform serial in parallel out conversion and parallel load serial out conversion. Then, a detection is made about whether the contents of the address field of the serial-parallel converted serial data frame coincides with the address of the slave station which is selected by setting of the switch 16, by an address coincidence circuit 15. When the address coincidence circuit 15 detects that this slave station is being accessed, the output latch 17 stores the output data. Therefore, contents of data field which is once stored in the shift register 14 is replaced by new input data 13. The replaced input data 13 is included in the signal which is parallel-serial converted transmitted signal 10, and then is electro-optically converted into an optical signal by an electro-optical converter 9. When the address does not make coincidence, the received serial data frame 8 is transmitted further as the transmitted serial data frame 10 as it is.

The above-mentioned operation is controlled by the timing signal generator 18.

In the above-mentioned way, the serial data frame transmitted from the master station of FIG. 12 is further transmitted to the respective slave stations in turn. Only when the selected address field of the address data coincides with the address of slave station is a control data for that slave station issued, and the input data from the sensors of that slave station is added to the data to be transmitted into the serial data frame and transmitted to the master station 5. The master station 5 reads and analyzes thus-transmitted address field and data field in the serial data frame, which are transmitted back thereto. Therefore, from the serial data frame, the operation state of the sensors of the particular slave stations is read and analyzed.

In the above-mentioned conventional configuration, it has been that: in order to know change of input data of a particular slave station by the master station, the master station outputs a serial data frame having an address field of that particular slave station, and the master station compares the contents of the serial data frame returned from the slave station with that of the previous data field stored therein.

Figure 15:
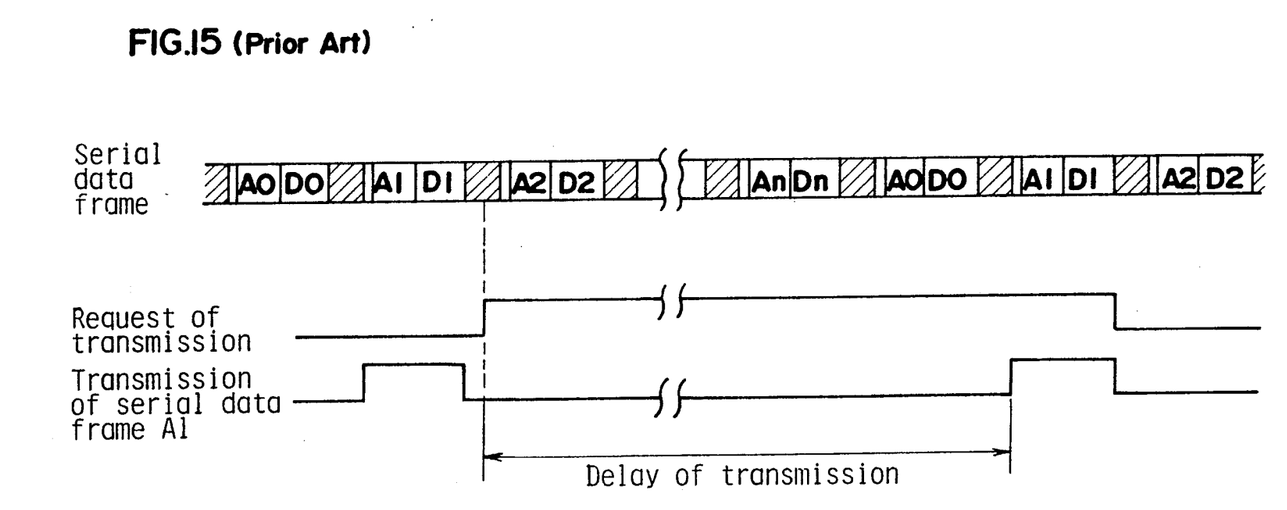
FIG. 15 is time chart showing transmission signal at an interrupt transmitting.

Therefore, in order to know the change in the input data of the slave station by the master station automatically, the configuration must be such that the master station serially outputs a serial data frame which includes the address field of every slave stations in turn as shown in FIG. 15. According to such configuration, the slave stations are scanned in turn, and serial data frame of the particular slave station is issued cyclically with a predetermined time period.

However, according to such configuration, in case when input data A1 of a particular slave station changes immediately after a scanning of the slave station A1 basing on its address in the address field, thereby making a request of transmission of such change, a time period corresponding to a time necessary for one cycle of scanning of the loop becomes necessary. Accordingly, there has been a problem that a considerable delay of time from the occurrence of a request of transmission to actual transmitting, and further, dispersion of the delay time is considerable. Therefore, when a high response characteristic is necessary, for instance in an automatic machine, the above-mentioned conventional configuration can not be utilized.

OBJECT AND SUMMARY OF THE INVENTION

The present invention purposes, in view of the above-mentioned problems, to provide an improved configuration of data transmission apparatus wherein a master station can distinguish a serial information transmitted by interrupt from other serial informations, when there arises a request that a slave station should transmit data to the master station and immediately transmit such data to the master station by interrupt transmission.

Furthermore, the present invention purposes to provide a data transmission apparatus wherein the slave station, by its initiative, can transmit serial data frame to be transmitted by interrupt to the master station.

Furthermore, another purpose of the present invention is to provide a data transmission apparatus capable of carrying out that when an input data of a slave station makes any change, the slave station transmit a serial data frame which is made by altering an information continuously transmitted from the master station into a serial data frame to be transmitted by interrupt, which serial data frame includes address of this slave station and data field having contents produced in this slave station and to be transmitted by the interrupt.

In order to achieve the above-mentioned purpose, the data transmission apparatus in accordance with the present invention comprises: a master station comprising a data transmission means for transmitting serial data frame of a format including head field (such as start bit, for start information), address field (for address information) and data field (for data information); plural slave stations each comprising data receiving/transmitting means for receiving and transmitting serial data frame (i.e. serial information) of a format including the head field, the address field, the data field and an interrupt field (such as interrupt bit) related to interrupt transmission from the slave station to the master station; and a loop-shaped transmitting line which connects the master station and the plural slave station in a ring type connection.

Furthermore, in some mode of the data transmission apparatus in accordance with the present invention: the slave station comprises means for transmitting, to the master station, a data field to be transmitting by interrupt in a form of serial information which further is combined with address of that slave station and an interrupt part; and the master station comprises means for detecting and receiving such serial data frame which is transmitted by interrupt from the slave station among many serial data frames received thereby, by distinguishing by means of the interrupt part.

Preferably, the slave station comprises means for detecting change, if any, of input data which are input parallelly from outside, and receiving/transmitting means for receiving the above-mentioned changed input data as data field to be transmitted by interrupt, combining it together with address of its own slave station to produce a serial data frame (for serial information) which consists of combination of the address field and the interrupt part and transmitting it to the master station. The slave station may further comprise means for once storing a received signal when the received signal is inputted thereto for the period of transmitting of serial data frame from the slave station to the master station, and still further may comprise delay means for delaying transmission of the serial data frame to the master station until accomplishment of a receiving of the above-mentioned received signal, when the input data which are input parallelly from outside makes a change during a receiving of the received signal.

Further, the master station may comprise transmission means for transmitting respective serial data frame consecutively by changing the address field in turn. And the slave station comprises transmitting means for converting transmitting to said master station a serial data frame to be transmitted by interrupt in a form of serial data frame which has a combination of address of that slave station and data and for adding interrupt field.

In this case also, the slave station preferably comprises: detection means for detecting change of input data which are parallelly inputted thereto; transmission means for making serial data frame to be transmitted by interrupt (and transmitting to the master station) serial data frame which is a combination of address of the slave station itself, the interrupt bit and the data field. Further, the slave station comprises delay means for delaying transmission of the serial data frame to the master station, at an occurrence of data to be transmitted by interrupt during receiving of a signal to be received, until a completion of said receiving of the signal to be received.

According to the present invention, since format of the serial data frame has an interrupt field, when certain data field should be transmitted by interrupt from the slave station to the master station, by attaching interrupt field to the data field thereby marking that this is the interrupt-transmitted information, the master station can find the interrupt bit, and hence the interrupt-transmitted serial data frame among many serial data frames sent back thereto. And thereby, the master station can find the interrupt-transmitted information sent from the slave station from the address and data of the serial data frame. Therefore, when data to be transmitted by interrupt is generated, the slave station can immediately transmit them to the master station.

Furthermore, when a data to be transmitted by interrupt from a slave station to the master station is generated, certain serial data frame including the data to be transmitted by interrupt can be transmitted immediately by interrupt, since each slave station itself has mean for transmitting the serial data frame to the master station. In this case, by providing means for storing serial information received during the transmitting in each slave station, neither interference between the transmitted serial information and the received serial information, nor omission of some part of serial information to be received does take place.

Moreover, serial data frame to be transmitted by interrupt can be transmitted immediately; since the master station consecutively transmit serial data frame with changing address field in turn thereby to scan the slave stations, and upon generation of certain data to be transmitted by interrupt in the slave station, which alters the serial data frame received immediately thereafter into altered serial data frame including the certain data attached by interrupt bit and transmit to the master station. And by the above-mentioned designing of the system, the configuration of the slave station becomes simple, and further, undesirable collision of the serial data frame to be transmitted by interrupt with the serial data frame to be received does not take place; and hence, multiple interruption in one transmission line becomes possible.

Furthermore, by providing detection means for detecting input data and transmission means for transmitting the detected change of data by interrupt in the slave station, the change of the input data can be immediately transmitted by interrupt to the master station, thereby enabling quick response to the state of the slave station.

Moreover, by providing means to delay the transmission of the serial data frame, the interference between serial data frame can be avoided by providing delay means for delaying the transmission even when the input data changes during receiving of a received other several information.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 1, 2, 3, 4, 5, 6 and 7 show a first preferred embodiment of the present invention wherein:

FIGS. 8, 9, 10 and 11 show a second preferred embodiment wherein:

FIG. 12, FIG. 13, FIG. 14 and FIG. 15 show conventional example wherein

DESCRIPTION OF THE PREFERRED EMBODIMENTS

Hereafter, a first preferred example is elucidated with reference to accompanying drawings FIG. 1–FIG. 7.

Configuration of Slave Station

Figure 1:
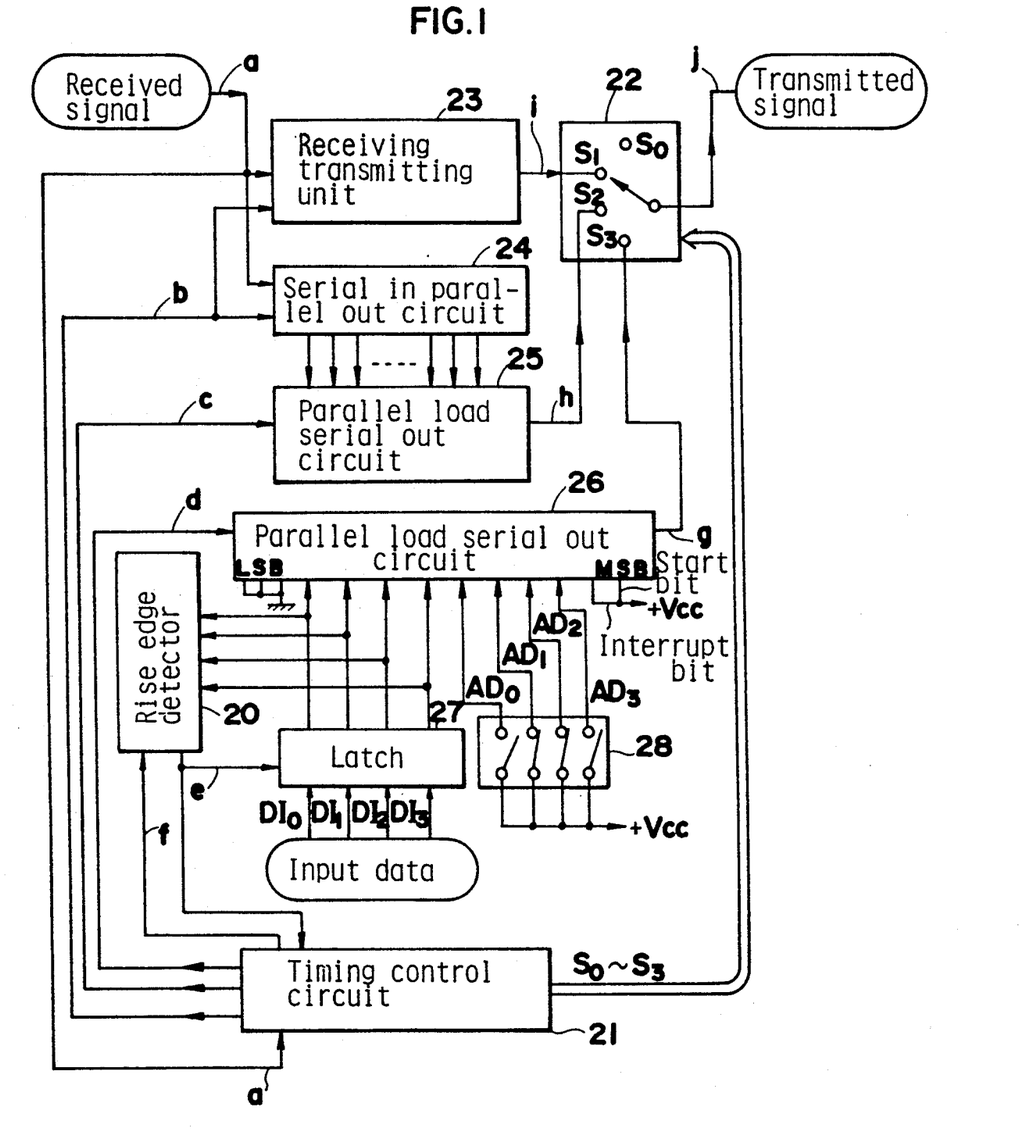
FIG. 1 is a circuit block diagram of a slave station of the embodiment.

In the circuit of FIG. 1 which shows circuit configuration of a slave station, rise edge detector 20 is for detecting rise edges of parallel input data $DI_0$, $DI_1$, $DI_2$, $DI_3$, and issues output signal "e" to a timing control circuit 21 and to a latch 27. The timing control circuit 21 also receives received signal "a" to this slave station. The timing control circuit 21 issues shift pulse "b" to receiving/transferring unit 23 and to serial in parallel out circuit 24. It further sends shift pulse "c" to a first parallel load serial out circuit 25, a shift pulse "d" to a second parallel load serial out circuit 26, reset signal "f" to the rise edge detector 20 and control signals $S_0$, $S_1$, $S_2$, $S_3$ for controlling selection switch 22 to select outputs of the transmitted signal j.

The above-mentioned receiving/transferring unit 23 corresponds to the slave station shown in and described on FIG. 13 as the conventional example, which comprises a shift register 14, an address coincidence detection circuit 15, address setting switch 16 and output latch 17.

The above-mentioned serial in parallel out circuit 24 is a circuit for once storing the received signal which is given as serial data frame and to output it as parallel information.

The above-mentioned first and second parallel load serial out circuits 25 and 26 are for outputting the parallel information respectively at the timings of shift pulses "c" and shift pulses "d", respectively, in a serial data frame in a row of an order beginning from the most significant bit (MSB) in turn. The second parallel load serial out circuit 26 is for transmitting parallel input data $DI_3, \ldots DI_0$, which are transmitted from the slave station by interrupt, in a form of serial data frame.

To the second parallel load serial out circuit 26, the above-mentioned input data $DI_3, \ldots DI_0$ are inputted through a latch 27. This latch 27 is for latching the input data when detection signal "e" to the rise edge detector 20 is "1", and passes the input data therethrough when the detected signal "e" is "0". In this second parallel load serial out circuit 26, a signal from an address setting switch 28, which is for setting address field of this slave station, is inputted. A positive voltage source +Vcc represents a logic input "1".

Furthermore, +Vcc is inputted to MSB which is defined as a start bit by the below-mentioned transmission format, and the next bit (to the MSB) defined as an interrupt bit, thereby to fix them to logic "1". Thus, the interrupt bit is transmitted in the form of serial data frame which becomes "1" at the instance of the transmitting.

Furthermore, the least significant bit (LSB) and two bits upper therefrom are fixed to the logic "0". This is in order that no signal is issued to make a blank time for enabling distinguishing between rise edge of start bit and rise edge of other bits can be made by the slave station and the master station.

Operation of Slave Station

Figure 2:
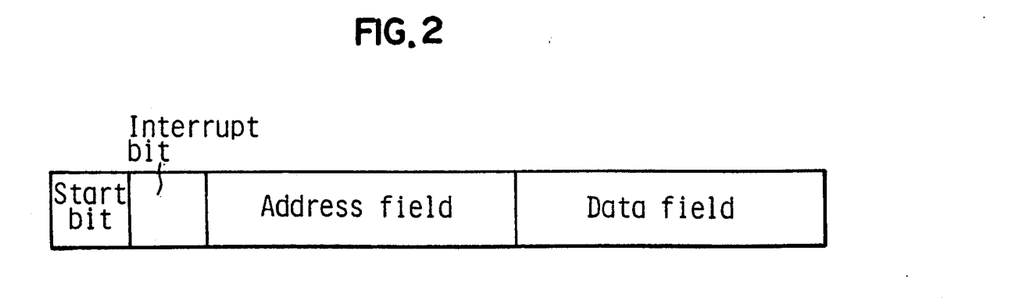
FIG. 2 is a diagram showing transmission format of the embodiment.

FIG. 2 shows transmission format of the embodiment of the present invention. This transmitting format consists of start bit (for start information), interrupt bit (for interrupt information), address field (for address information) and data field (for data information). The start bit is fixed always to logic "1". The interrupt bit is logic "1" in serial data frame (for serial information) when transmitted from the slave station by interrupt. The address field distinguishes this slave station from other slave stations. In this example, for simplification of the elucidation, the address field and data field are shown as four bits.

Figure 3:
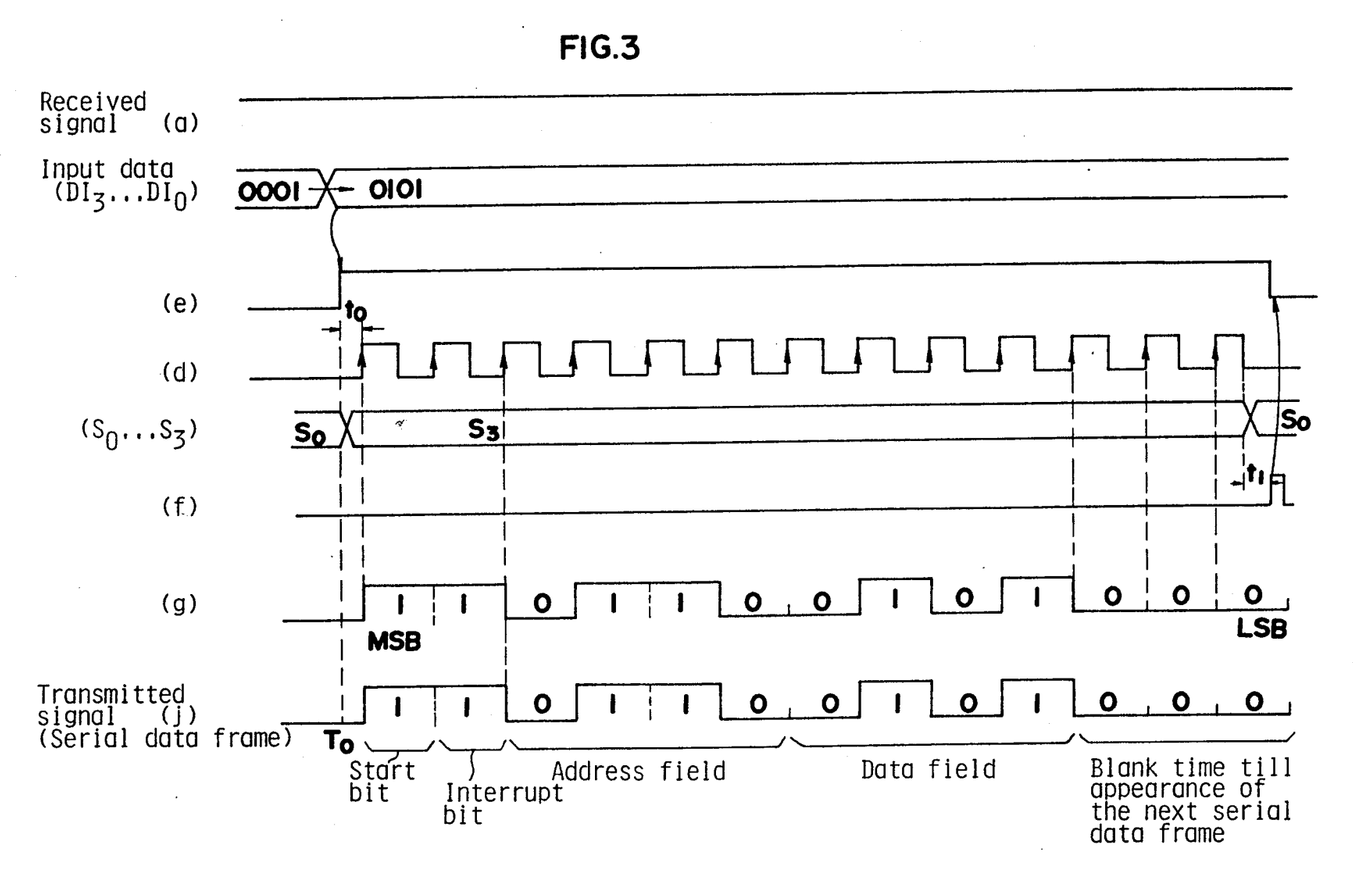
FIG. 3 is time chart showing transmission of serial data frame by interrupt in the slave station of the embodiment.
Figure 4:
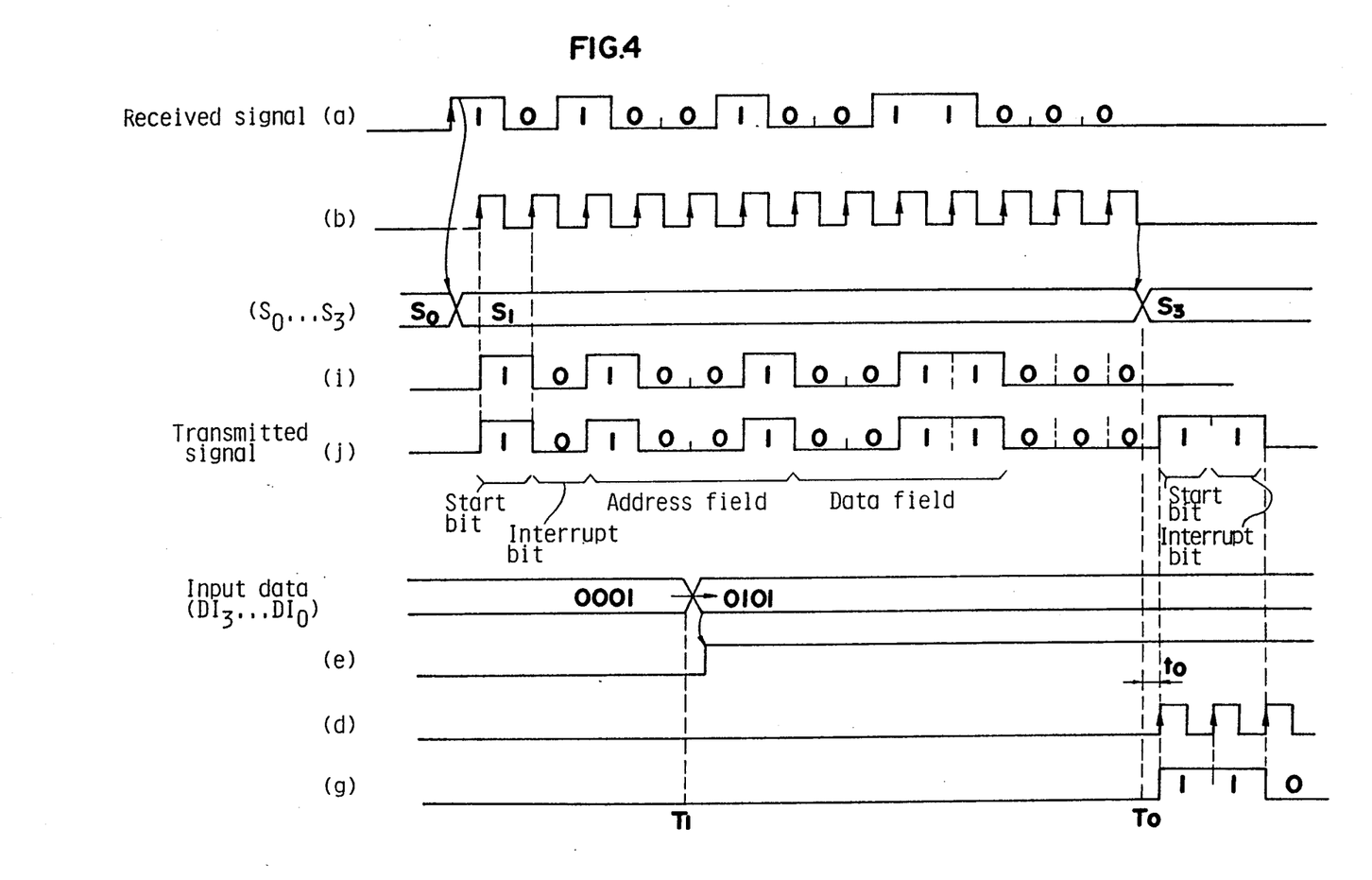
FIG. 4 is time chart showing timing of transmission operation when input data changes during a receiving of signal.
Figure 5:
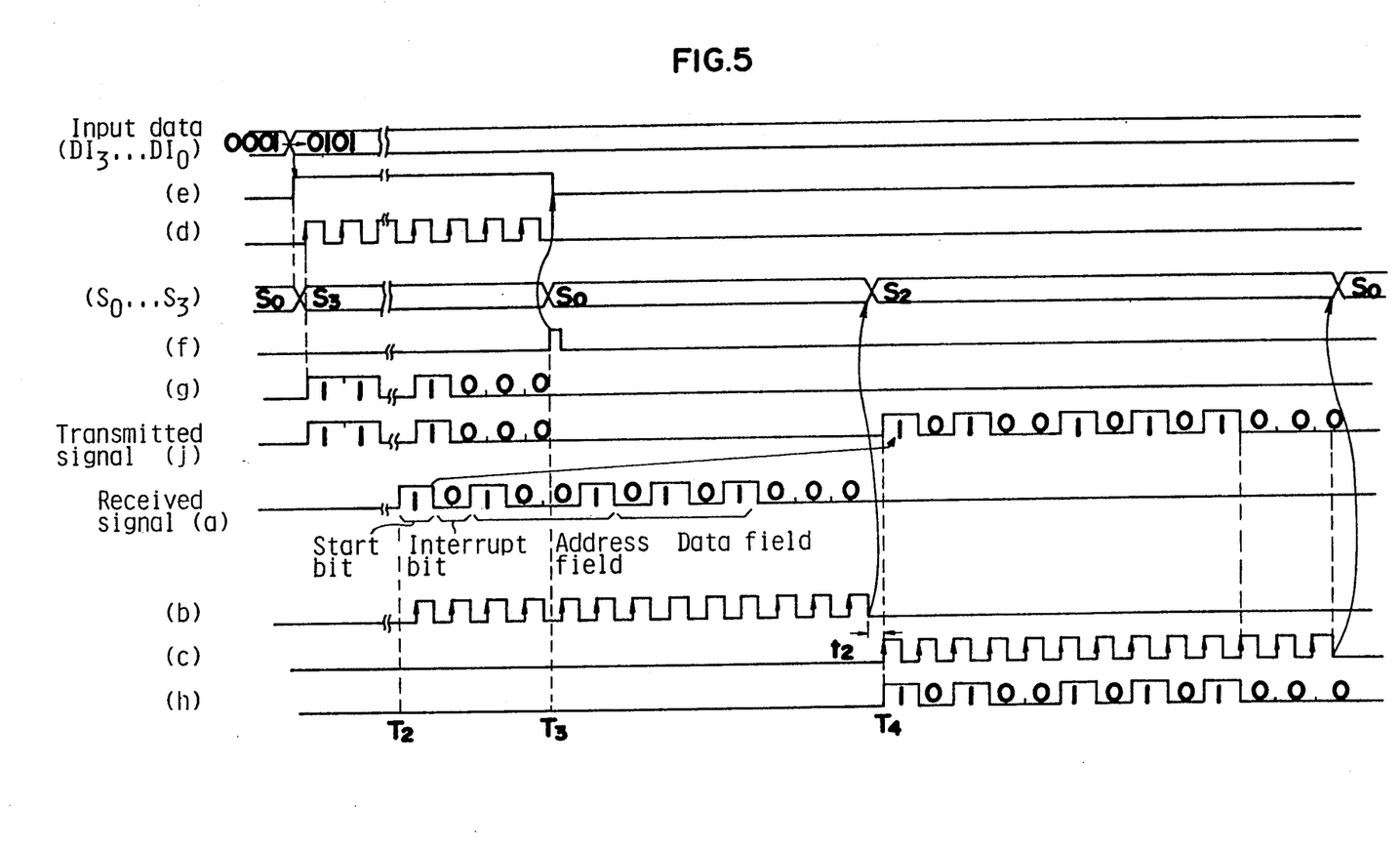
FIG. 5 is timing chart showing operation of the slave station when the received signal is inputted thereto during transmission.

Next, transmitting operation of serial data frame by interrupt from a slave station to the master station is elucidated with reference to FIG. 3, FIG. 4 and FIG. 5.

Firstly, the operation of transmitting the serial data frame when a received signal "a" is not inputted to the slave station is described with reference to FIG. 3.

Now let us assume that the input data i.e. $DI_3$, $DI_2$, $DI_1$, $DI_0$ of the slave station, for a instance, change from 0001 to 0101, namely, the input data $DI_2$ changes from "0" to "1". Then, the rise edge detector 20 detects such change and the control signal "e" becomes "1", and the input data are latched by the latch 27. And at inputting of the control signal "e", the timing control circuit 21 is triggered, thereby changing the control signal to the selection switch 22 from $S_0$ to $S_3$. Therefore, output "g" from the second parallel load serial out circuit 26 becomes the transmission signal "j".

Next, after lapse of time period of $t_0$, the timing control circuit 21 issues shift pulses "d" to the second parallel load serial out circuit 26. The shift pulses "d" consists of 13 pulses which are more than 10 bits of the total information amount by 3 bits. Accordingly, outputs are issued from the MSB of the parallel load serial out circuit 26 in turn, and always 3 bits or more of "0" are issued at the last part, and the transmission signal "j" is transmitted in such manner.

Subsequently, upon the fall of the last shift pulse "f", the selection switch 22 is restored to the original position $S_0$. Furthermore, after lapse of time period of $t_1$, the timing control circuit 21 issues a reset signal "f" and resets the rise edge detector 20. Therefore, the control signal "e" is restored to "0" and the latch 27 is restored to the original state.

Next, interrupt transmission of serial data frame by a slave station upon a change of input data, during a reception of the received signal "a" by the slave station as aforementioned, is elucidated with reference to FIG. 4

In FIG. 4, $T_1$ is the point of time when the input data changes and $T_0$ is a point of time of starting the transmitting of the serial data frame.

Firstly, a rise edge of a start bit of the received signal "a" is detected by the rise edge detector 20, and the timing control circuit 21 issues a control signal, and thereby the selection switch 22 is switched from $S_0$ to $S_1$. Subsequently, the timing control circuit 21 issues thirteen shift pulses "b" of FIG. 4. Thereby, rise timings and fall timings of the serial data frame, namely the phases are arranged by the receiving/transferring unit 23; and the received signal "a" itself becomes the transmitted signal "j".

In the above-mentioned last step, when the input data $DI_3$, $DI_2$, $DI_0$ changes at the point of time $T_1$, the control signal "e" from the rise edge detector 20 becomes "1". But the timing control circuit 21 retains the same state until the transmission of the aforementioned shift pulses "b" are completely over, pending the issuing of shift pulses "d". Therefore the selection switch 22 also remains the same position $S_1$.

When the transmitting of the shift pulses "b" is over and the aforementioned transmitting of the transmitted signal "j" and the timing comes to $T_0$, the timing control circuit 21 switches the selection switch 22 to position $S_3$ after lapse of time period $t_0$. And the operation thereafter is quite the same as that of FIG. 3.

Next, an operation of a certain slave station at such time when it receives a received signal "a", during the while the slave station is transmitting the serial data frame by the interrupt to the master station based on a change of its input data, is elucidated with reference to FIG. 5.

Assuming that, during the transmitting of the serial data frame, the received signal is inputted at the time $T_2$, and the timing control circuit 21 detects the rise edge of the received signal "a". The timing control circuit 21 then issues 13 shift pulses "b", and, the serial in parallel out circuit 24 takes these received signal "a" in and stores therein as parallel signal. Since the received signal "a" and the transmitted signal "j" are of the same bit length, the transmitting is already over at the time $T_3$, and the timing control circuit 21 switches the selection switch 22 from $S_3$ to $S_0$. When the storing of the received signal "a" is accomplished at the time $T_4$, the timing control circuit 21 switches the selection switch 22 from $S_0$ to $S_2$.

Since the received signal "a" stored in the serial in parallel out circuit 24 is inputted in the parallel load serial out circuit 25, it is of ready state to reproduce the received signal "a" and issue the same. The timing control circuit 21 issues shift pulses "c" after lapse of time period of $t_2$ from accomplishment of switching of the selection switch 22 to $S_2$, and issues the transmitted signal "j" which is the same serial data frame as the received signal "a".

Operation of the Master Station

Figure 6:
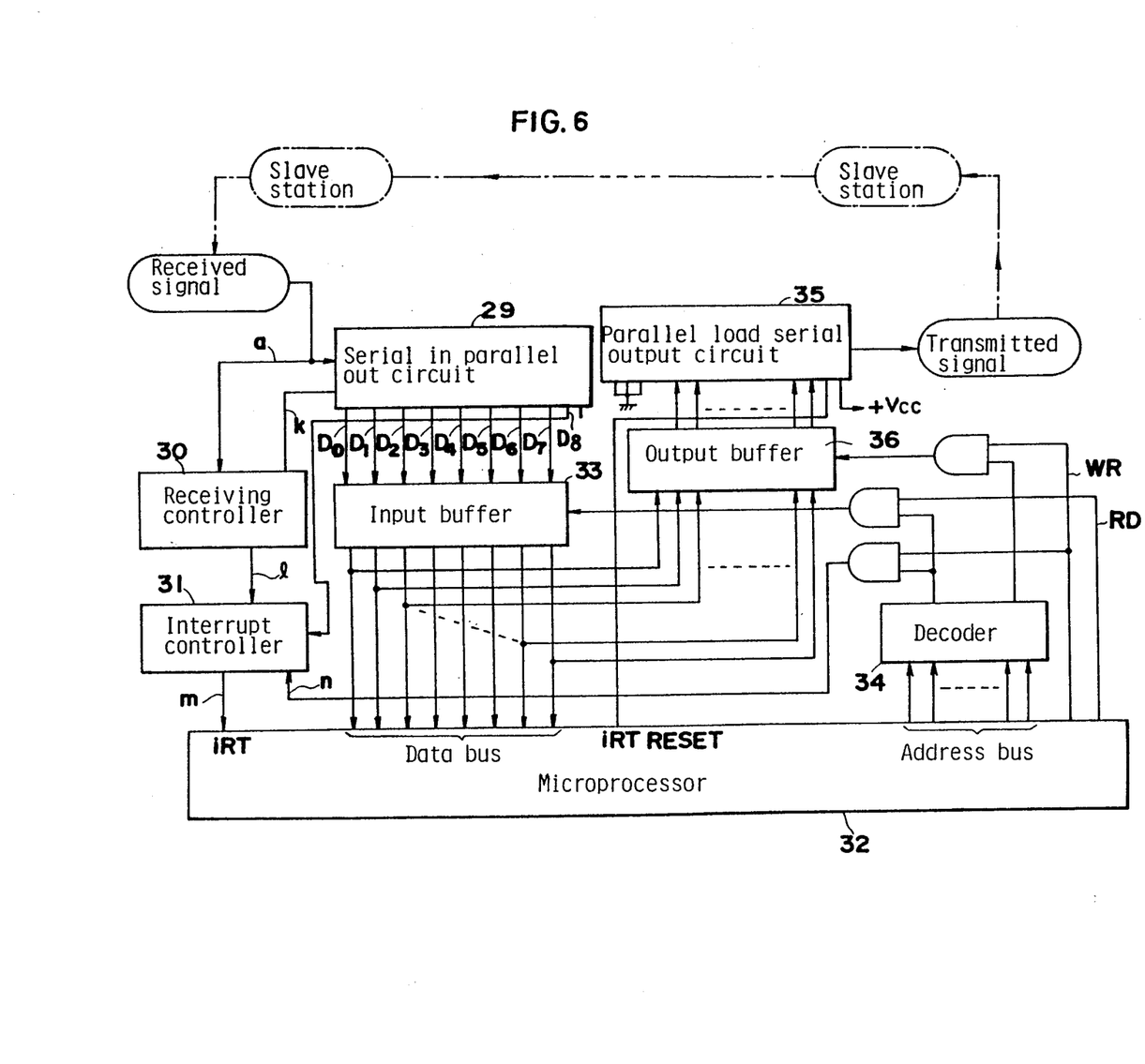
FIG. 6 is a circuit diagram showing configuration of receiving part of the master station.
Figure 7:
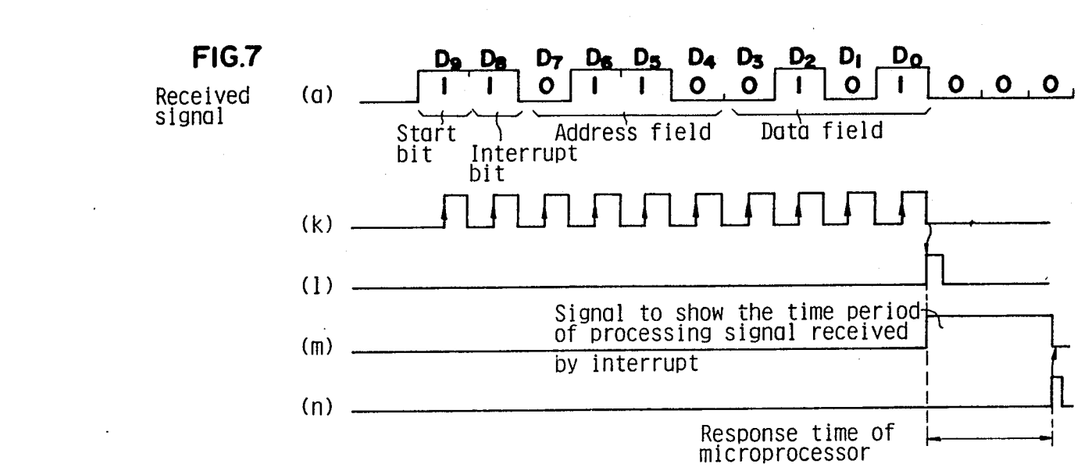
FIG. 7 is timing chart showing operation of the same receiving part.

Next, operation of the master station is elucidated with reference to FIG. 6 and FIG. 7. For the simplicity of illustration, FIG. 6 shows only the part for receiving the serial data frame returning from the last stage slave station.

In FIG. 6, the received signal "a" is inputted to a serial in parallel out circuit 29 of 10 bits configuration and the receiving controller 30. The receiving controller 30 detects rise edge of the start bit of the received signal "a", thereby issues shift pulses "k" to a serial in parallel out circuit 29. At the completion of outputting of the shift pulses "k", the receiving controller 30 issues a completion signal 1 to an interrupt controller 31.

The interrupt controller 31 issues an interrupt signal "m" to a microprocessor 32 responding to the interrupt bit of the serial data frame. To tell in more detail, after issuing of 10th pulse of the received signal "a", the receiving controller 30 issues the completion signal "1" to the interrupt controller 31, and upon reception of completion signal "1" the interrupt signal "m" becomes "1" when the interrupt bit $D_8$ is "1".

When the interrupt signal "m" is inputted to the microprocessor 32, a jump to a particular address programmed in a memory (not shown) is made, and upon reception of an input instruction, a RD signal (instruction to read) is issued, and data $D_7$, $D_6$, $D_5$, $D_4$, $D_3$, $D_2$, $D_1$, $D_0$ of serial in parallel out circuit 29 are inputted through input buffer 33 to the microprocessor 32. And the master station read contents of the incoming serial data frames and analyzes them to know which slave station transmitted the data by interrupt, and makes necessary operation thereto. Upon issuance of an output instruction, a WR signal (instruction to write) is issued, and a reset signal "n" is issued to the interrupt controller 31, and the operation is over. Numeral 34 designates a decoder for decoding the address signal.

Apart from the above-mentioned embodiment where interrupt bit is provided separately, other mode can be made wherein a bit for writing the interrupt bit is provided in a part of the address field. Thereby, by using a common transmission line, both the slave stations in accordance with the present invention and the slave station of the conventional type can be connected together on a common transmission line.

In the above-mentioned embodiment, address field and data field of the serial data frame are of 4 bits, respectively, but it is of course, other length of bits can be used similarly.

Figure 8:
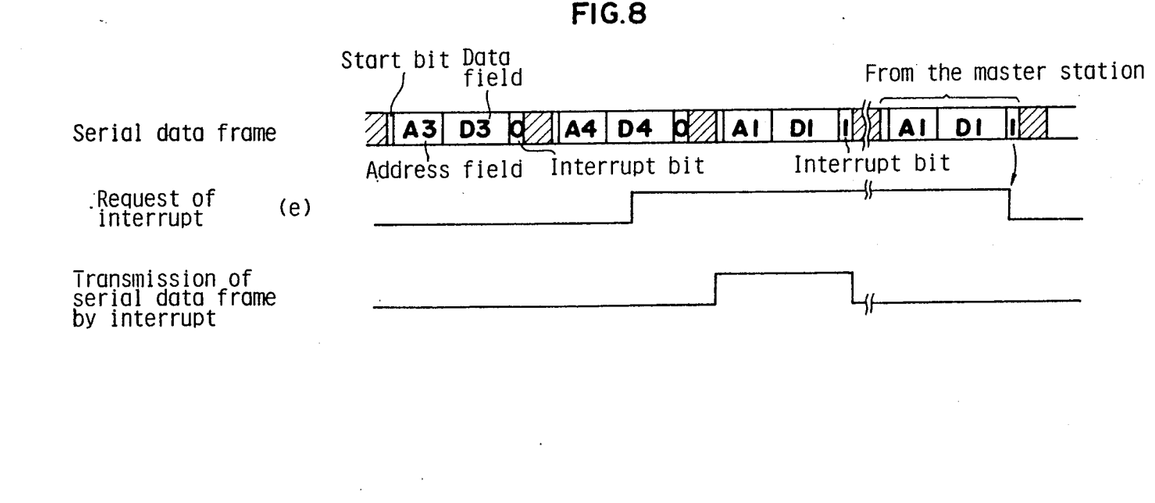
FIG. 8 is timing chart showing transmission signal at interrupt transmitting.

Apart from the above-mentioned embodiment wherein at a change of input data of the slave station the slave station transmits serial data frame by its own initiative, a different embodiment can be made wherein the master station in turn scan the respective slave stations, as shown in FIG. 8.

That is, FIG. 8 shows transmission format and related time chart of the second embodiment wherein configuration is that, for instance, at an occurrence of input data in a slave station A1 and hence occurrence of a request for an interrupt, when a received signal, which is received immediately thereafter by the slave station A1, is a received signal of the slave station A5, the address of the slave station A1 is written in the address field, by neglecting the received signal (of the slave station A5), and the input data D1 (from the slave station A1) is written in the data field, and "1" as the interrupt bit is transmitted; so that the input data D1 is transmitted by interrupt. Such operation is carried out substantially by using the slave station of FIG. 1 and the master station of FIG. 6.

Furthermore, in the embodiment of FIG. 8, the system is made such that; at the reception of the interrupt transmission by the master station, a serial data frame having the address field of A1 and interrupt bit of "1" is transmitted; and the slave station A1 receives the serial data frame and resets the interrupt request.

In this second embodiment, the configuration of the slave station is substantially the same as that elucidated with reference to FIG. 1 for the first embodiment. But in this second embodiment, since the transmission and receiving of the serial data frame is controlled by the scannings of slave stations, there is no fear of undesirable inputting of the received signal "a" during the while of transmitting from the slave station.

Accordingly, the internal configuration of the timing control circuit 21 becomes simple, serial in parallel out circuit 24 and the first parallel load serial out circuit 25 which have been necessary as that 24 and 25, respectively, in the first embodiment are no more necessary.

Figure 9:
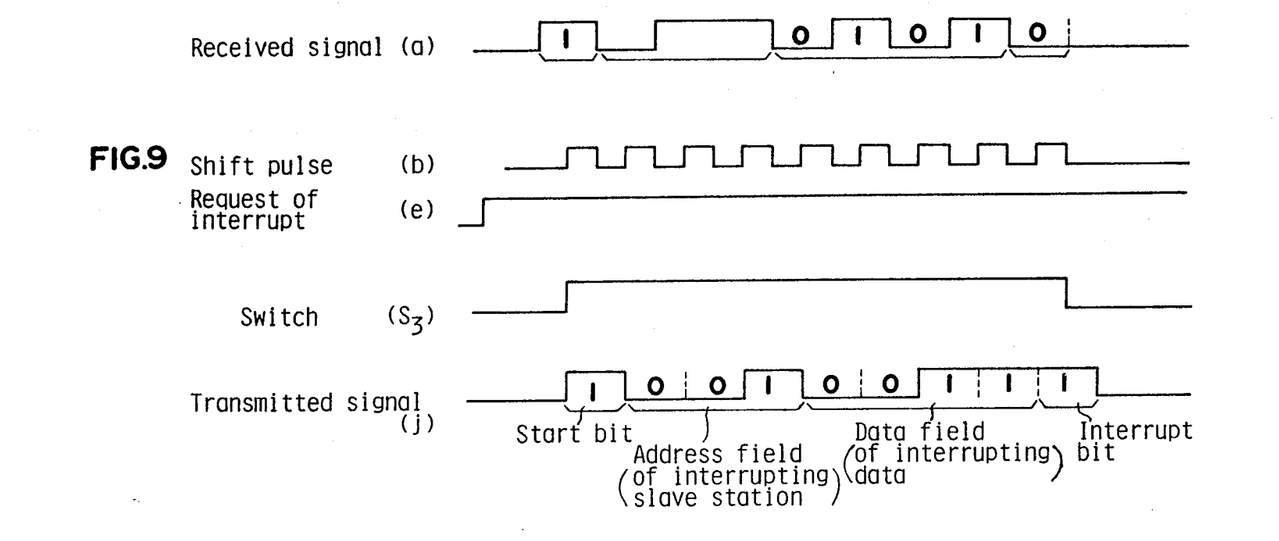
FIG. 9 is timing chart showing operation of the transmission.

The operation at the transmission from the slave station is as shown in FIG. 9, similar to that elucidated for the first embodiment with reference to FIG. 3 and FIG. 4. But small difference is that, at a completion of receiving, the point of time $T_0$ for starting interrupt transmission is at rise edge of the start bit of the next received signal "a".

The format of the serial data frame of this embodiment comprises a start bit, address field of 3 bits, data field of 4 bits and an interrupt bit disposed in this order. Of course, the order of disposition can be changed as desired.

Figure 10:
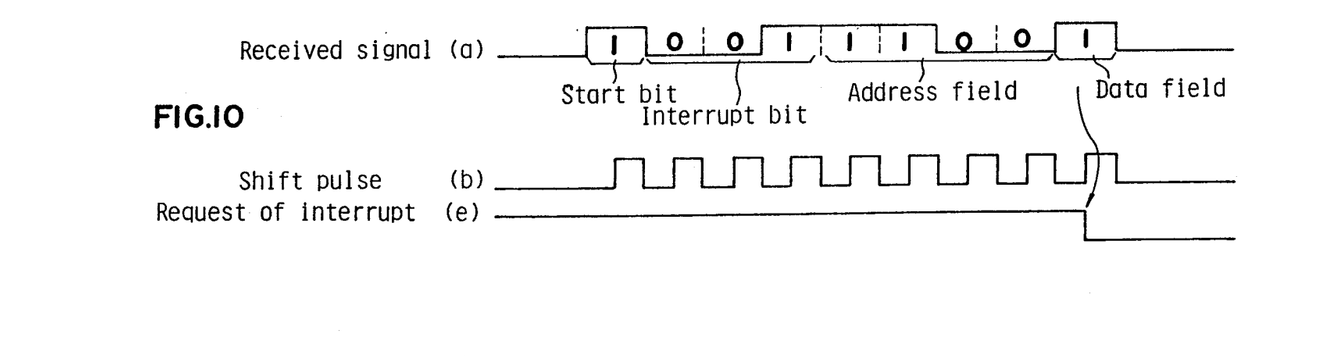
FIG. 10 is timing chart showing operation of interrupt demand reset.

A serial data frame, which is transmitted after reception by the master station of an interrupt transmission from a slave station for confirmation thereof is, as shown in FIG. 10, received by the slave station; and a detection is made for detecting that the interrupt bit is "1", and the interrupt request is reset. Therefore, in the slave station, though it is not shown in the drawing, it is configurated such that an output of the interrupt bit from the receiving/transferring unit 23 is inputted to the timing control circuit 21; and when the interrupt bit is "1", a reset signal "f" is outputted to the rise edge detector 20.

Figure 11:
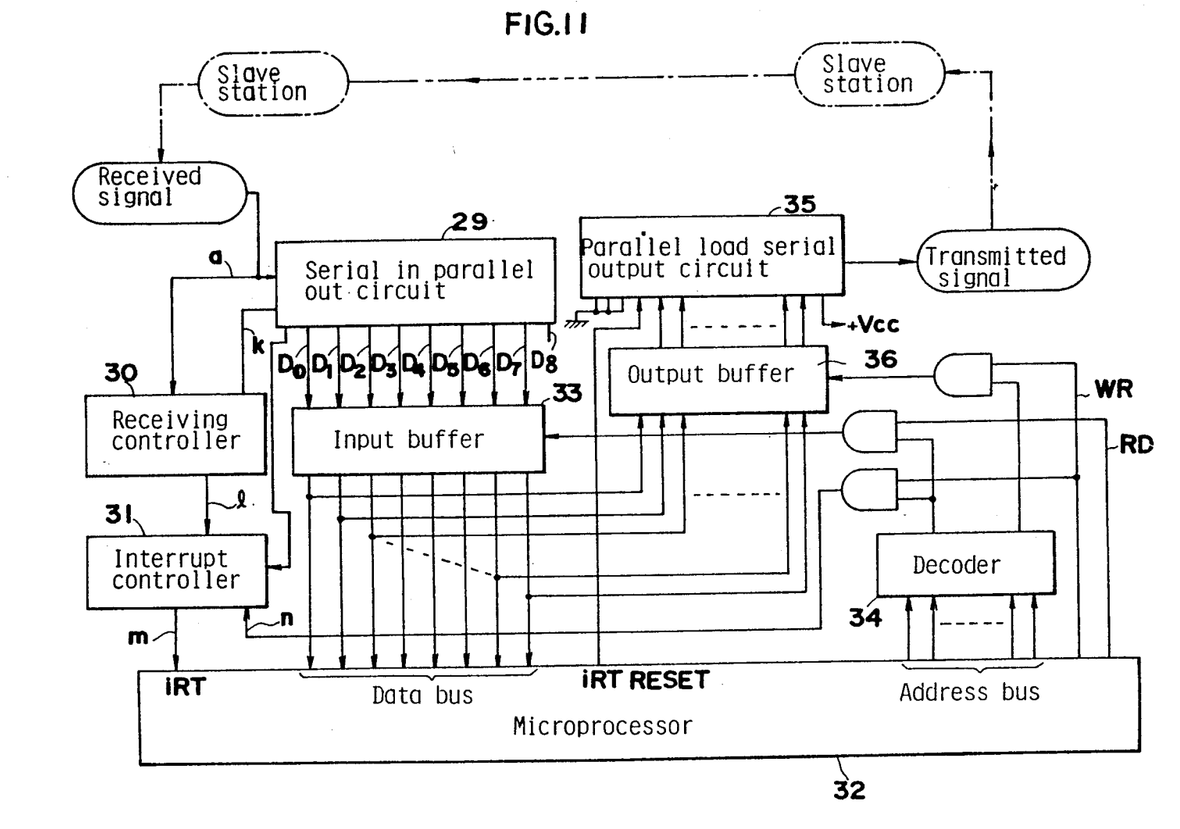
FIG. 11 is circuit block diagram of the master station.

On the other hand, in the master station, as shown in FIG. 11 the similar receiving part is provided like as described with reference to FIG. 6. Besides, a parallel load serial out circuit 35 for outputting transmission signal is provided; and from data bus of the microprocessor 32, data relating to address field and the data field are inputted through the output buffer circuit 36. Furthermore, interrupt reset signal from the microprocessor 32 is inputted to the terminals corresponding to interrupt bit.

This master station of FIG. 11 is configurated such that address field inputted from the microprocessor 32 to the parallel load serial out circuit 35 and data field to the slave station, which is identified by the address field, are combined into a combination data; and the combined data is then transmitted in a serial data frame upon generation of WR signal, and the above-mentioned processes are repeated by changing the address in turn; and in this way, the master station scans the slave stations. When the serial data frame transmitted by interrupt from the slave station is received, the master station gives data $D_7$, $D_6$ ... $D_1$ of the serial in parallel out circuit 29 to the microprocessor 32 as has been elucidated with reference to FIG. 6 and FIG. 7, thereby to make necessary processing to the slave station; and when transmitting is made by the next WR signal, such serial data frame that which is a combination of the address field of the slave station transmitting the serial data frame by interruption and the interrupt reset signal is transmitted.

In the above-mentioned embodiment, the reset of interrupt request is made by transmitting serial data frame which contains interrupt reset signal immediately after receiving of the interrupt bit by the master station, but other configuration can be made such that the interrupt reset signal may be transmitted when the next access to such slave station whereto the interrupt transmission has been made without breaking the scanning of the slave stations by the master station. Furthermore, as shown in the first embodiment, configuration may be such that the slave station resets itself after transmitting the serial data frame of interrupt.

In this embodiment of FIG. 8, since the transmitting is made by scanning of the slave stations, there is no fear of colliding with the serial data frame transmitted from the slave stations by interrupt, and accordingly, multiple interrupt can be made in a system of a loop type transmission line 6. Concerning the slave stations which are neglected of the scanning can be made at latest within one scanning delay, and there is no actual problem.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A loop-type communication system comprising a master station and a plurality of slave stations connected in series, and communicating an asynchronous serial data frame therebetween,
wherein each said serial data frame comprises a start bit for start information, an address field for distinguishing a target slave station, a data field for including digital data to be received by or to be transmitted from said target slave station and an interruption bit for representing interruption information from said target slave station, said master station comprising:
data transmission means for transmitting a serial data frame including said start bit, said address field and said data field to be transmitted to a slave station, and
receiving means for detecting a serial data frame including said interrupt bit transmitted from a slave station,
detecting means for detecting said interruption bit of the data frame;
each said slave station comprising:
data receiving means for receiving an input serial data frame including said start bit, said address field, and said data field;
serial data decoding means for parallel-to-serial converting an input data signal of said slave station and for inputting the parallel-to-serial converted input data signal to said data field of a serial data frame if the address field of said input data signal coincides with an address of said each slave station;
rising edge detector means for detecting a rising edge of at least one of plural signals inputted to said slave station;
interruption signal generating means for generating a first serial data frame in which said address of said each slave station is set in the address field, said input data signal is set in the data field and said interruption bit is set to represent interruption, and for transmitting said first serial data frame to the master station, when said rising edge is detected;
delay means for delaying operation of said interruption signal generating means until completion of said converting of said received serial data, when said rising edge is detected;
memory means for storing said received serial data during operation of said interruption signal generating means; and
means for connecting said master station and said plural slave stations.

2. A loop-type communication system in accordance with claim 1, wherein said connecting means is one single signal line, and said memory means also stores a received signal inputted during a transmission of said serial data frame to said master station.

3. A loop-type communication system comprising a master station and a plurality of slave stations connected in series and communicating an asynchronous serial data frame therebetween,
wherein each said serial data frame comprises a start bit for start information, an address field for distinguishing a target slave station, a data field for including digital data inputted to or to be transmitted from said target slave station and an interruption bit for representing interruption information from said target slave station;
said master station comprising:
data transmission means for transmitting a serial data frame including said start bit, said address field and said data field to be transmitted to a slave station,
receiving means for detecting a serial data frame including an interrupt bit transmitted from a slave station;
means for changing an address field in turn and transmitting a respective serial data frame consecutively; and
detecting means for detecting said interruption bit of the data frame;
each said slave station comprising:
data receiving means for receiving an input serial data frame including said start bit, said address field, and said data field;
serial data decoding means for parallel-to-serial converting an input data signal of said slave station and for inputting the parallel-to-serial converted input data signal to said data field when the address field of said input data signal coincides with an address of said each slave station;
rising edge detector means for detecting a rising edge of at least one of plural signals inputted to said slave station;
interruption signal generating means for generating a first serial data frame in which said address of said each slave station is set in the address field, said input data signal is set in the data field and said interruption bit is set to represent interruption, and for transmitting said serial data frame to the master station, when said rising edge is detected;
means for converting an address of said serial data which is received, immediately after occurrence of a data to be transmitted by interrupt, to an address indicative of said each slave station, and converting said data field to that of data to be transmitted by interrupt, and further combining said interrupt bit thereto to make a serial data frame, which is transmitted to said master station; and
a loop-type communication line which connects said master station and said plural slave stations.

4. A loop-type communication system comprising a master station and a plurality of slave stations connected in series and communicating an asynchronous serial information therebetween, said serial data frame comprising a start information, an address information for distinguishing a sending slave station, a data information to be transmitted to a slave station or to be transmitted from said sending slave station and an interruption information from said slave station, said master station comprising:
data transmission means for transmitting serial information including said start information, said address information and said data information to be transmitted to a slave station;
receiving means for detecting a serial information including said interrupt information transmitted from said slave station; and
detecting means for detecting said interruption information;

each slave station comprising:
data receiving means for receiving a serial information including said start information, said address information, and said data information;
serial data decoding means for parallel-to-serial converting an input signal of said slave station and for inputting the parallel-to-serial converted input signal to said data information if said input signal coincides with an address of said each slave station;
rising edge detector means for detecting a rising edge of at least one of plural signals inputted to each slave station;
interruption signal generating means for generating a first serial information in which said address of said each slave station is set in the address information, said input signal is set in the data information and the interruption information is set to represent interruption, and for transmitting said serial data to the master station, when said rising edge is detected;
delay means for delaying operation of said interruption signal generating means until completion of converting of said received serial data, when said rising edge is detected;
memory means for storing said received serial data during operation of said interruption signal generating means; and
loop-type communication line means which connects said master station and said plural slave stations.

5. A loop-type communication system in accordance with claim 4, wherein said connecting means is one single line, and said memory means is also for storing a received signal inputted during a transmission of said serial information to said master station.

6. A loop-type communication system comprising a master station and a plurality of slave stations connected in series and communicating an asynchronous serial information therebetween;
said serial data frame comprising a start information, an address information for distinguishing a target slave station, a data information to be transmitted to or from said target slave station and an interruption information from said target slave station, said master station comprising:
data transmission means for transmitting serial information including said start information, said address information and said data information to be transmitted to a slave station;
receiving means for detecting a serial information including said interrupt information transmitted from said slave station;
means for changing an address information in turn and transmitting a respective serial information; and
detecting means for detecting said interruption information of the data information, consecutively;

each slave station comprising:
data receiving means for receiving a serial information including said start information, said address information, and said data information;
serial data decoding means for parallel-to-serial converting an input signal of said slave station and for inputting the parallel-to-serial converted input signal to said data information, in the event that the address information of said input signal coincides with an own address of said slave station;
rising edge detector means for detecting a rising edge of at least one of plural signals inputted to each slave station;
interruption signal generating means for generating a serial information in which said own address is set in the address information, said input signal is set in the data information and the interruption information is set to represent interruption, and for transmitting said serial information to the master station, when said rising edge is detected;
means for converting an address of said serial information which is received, immediately after occurrence of a data to be transmitted by interrupt, to an address indicative of said each slave station, and converting said data information to that of data to be transmitted by interrupt, and further combining said interrupt information thereto to make a serial information, which is transmitted to said master station; and
a loop-type communication line means which connects said master station and said plural slave stations.

7. A system as in claim 6, wherein the serial data which is sent always has one as a start bit and a blank period between serial data, and the slave station is provided with transmission means for sending interruption serial data during a blank period after the reception of the serial data.

* * * * *